United States Patent [19]
Steudler, Jr.

[11] 3,789,800
[45] Feb. 5, 1974

[54] WATER FOUNTAIN SYSTEM
[75] Inventor: Frederick W. Steudler, Jr., Lancaster, Pa.
[73] Assignee: The Vallorbs Jewel Company, Lancaster, Pa.
[22] Filed: Apr. 24, 1972
[21] Appl. No.: 246,989

[52] U.S. Cl............ 119/18, 119/72, 119/81
[51] Int. Cl............................. A01k 07/00
[58] Field of Search.......... 119/18, 72.5, 75, 72, 81; 287/49, 51

[56] References Cited
UNITED STATES PATENTS
3,707,949  1/1973  Lippi.................................. 119/18
2,696,802  12/1954  Schmidt............................. 119/18

Primary Examiner—Hugh R. Chamblee
Attorney, Agent, or Firm—Diller, Brown, Ramik & Wight

[57] ABSTRACT

This disclosure relates to a novel system for suspending water fountains for mass poultry watering, and is particularly directed to means for coupling the supporting member of a water fountain to horizontal wires of a poultry cage, the coupling means being a clip having a bight portion and two pairs of spaced resilient legs whose ends are clamped to the wires and between each pair of legs is a slot for supportingly embracing the water fountain supporting member. Another clip is of a closed loop configuration defined by a pair of legs common to two bight portions which embrace a pair of water fountain supporting members, the clip being not only adjustable vertically with respect to a cage but also adjustably carries a support for a conventional water pipe.

18 Claims, 9 Drawing Figures

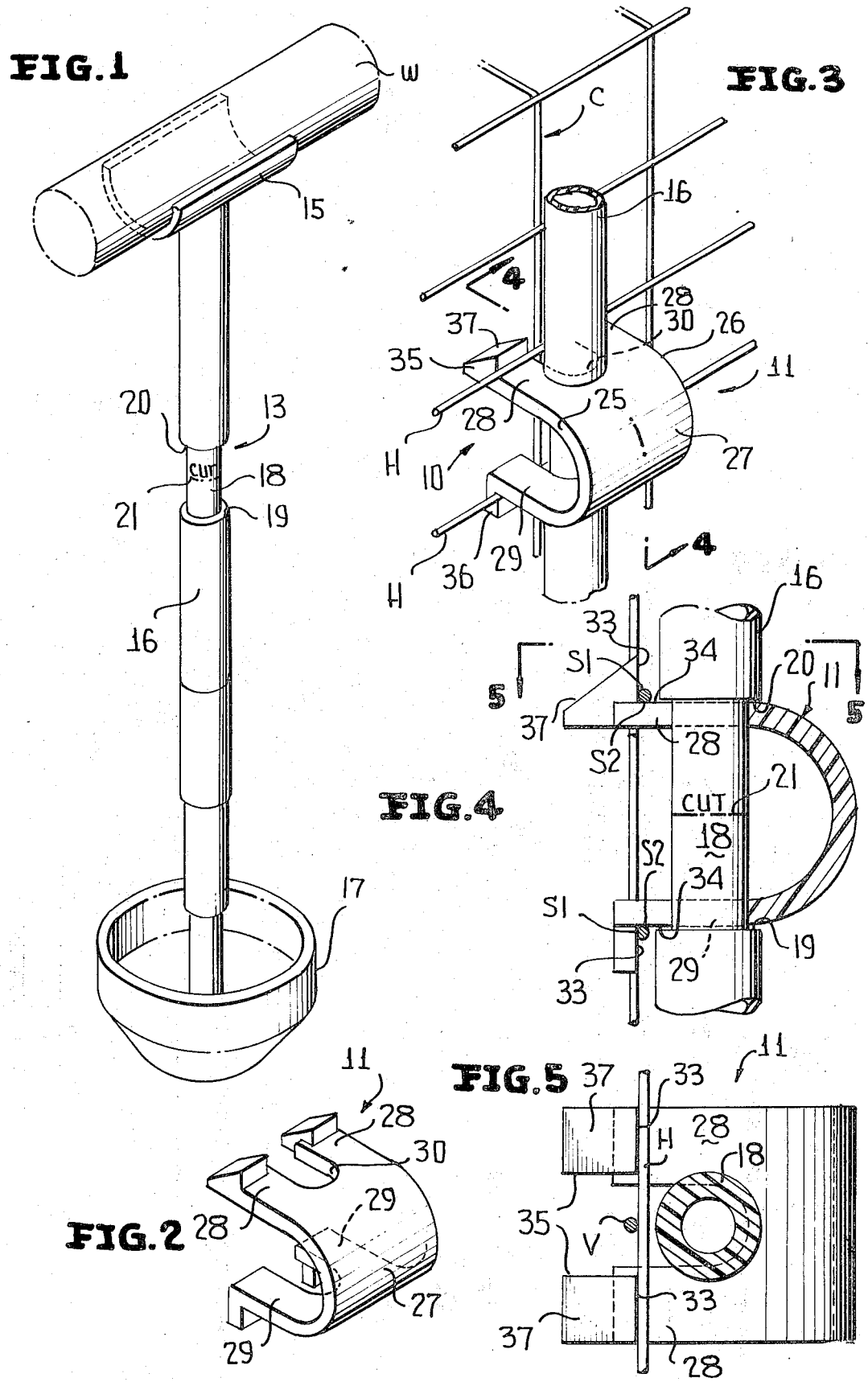

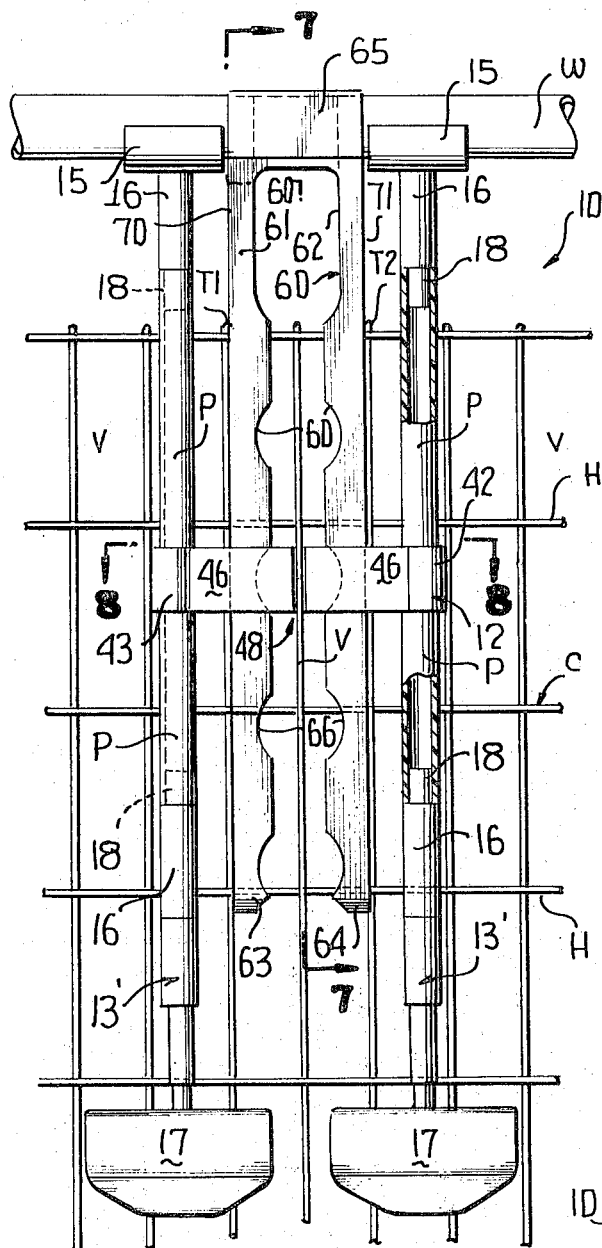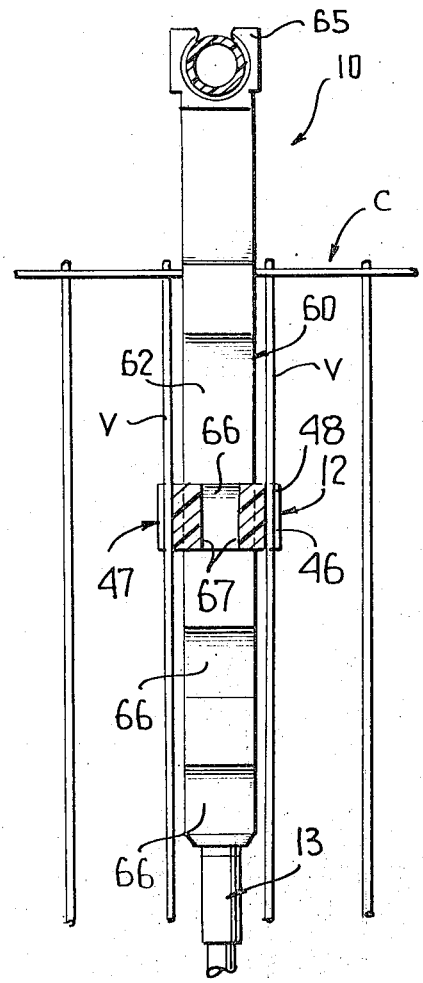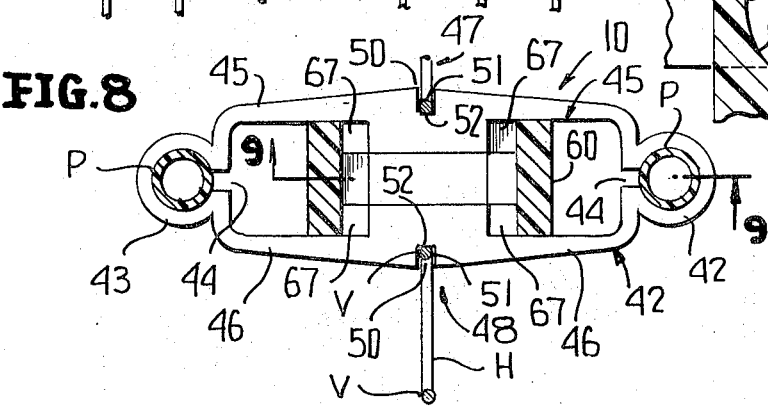

WATER FOUNTAIN SYSTEM

This invention is directed to a novel system for suspending water or drinking fountains from wire cages for the mass watering of poultry as, for example, chickens, ducks, geese, etc., from infancy to maturity. The particular water fountain of the suspension system forms no part of the present invention, but insofar as the specific structure of the water fountain is concerned, reference may be made thereto in application Ser. No. 230,388 filed on Feb. 29, 1972, entitled WATER FOUNTAIN in the name of Frederick W. Steudler, Jr., which is commonly assigned to the assignee of the present application.

Though conventional water or drinking fountains of the suspension type are relatively well known, little if any effort has been directed to incorporating any particular water fountain into an overall watering system which could be rapidly assembled, altered and disassembled as might be dictated by the particular animal being fed, the maturity thereof, etc. For example, if young chicks are to be raised in a cage without being removed until sufficiently mature for processing, the water fountains associated with the cage must necessarily be at a low level initially while being capable of vertical upward adjustment as the chicks grow. By the same token, if movement of the cages and/or chicks during the growth thereof is contemplated, the system must be sufficiently versatile to accommodate variations in cage design and component tolerances.

In accordance with the foregoing, a primary object of this invention is to provide a novel support or suspension system for water fountains which through the use of but a pair of clips can support water fountains singly or in pairs from wire cages in a manner providing rapid assembly, disassembly and/or adjustment thereof as conditions require.

The latter object is achieved by the provision of a first clip of a U-shaped configuration defined by a bight portion and two pairs of legs of resilient material, the legs having oppositely directed gripping fingers, and the gripping fingers being designed in such a manner as to engage adjacent horizontal wires of a cage to secure thereto a water fountain whose stem or supporting member is embraced by a slot between each of the two pairs of legs.

Still another object of this invention is to provide a novel water fountain suspension system wherein at least one of the legs includes cam means for rapidly assembling the clip to the cage by simple pivoting movement after one leg has been secured thereto.

Still another object of this invention is to provide another clip of a generally open loop configuration defined by two bight portions and a pair of legs common to both, each bight portion being in embracing relationship to the stem or supporting member of a water fountain, and means for securing the closed loop clip to adjacent vertical wires of a cage.

Still another object of this invention is to provide means for supporting a water pipe from the closed loop clip, as well as means for vertically adjusting the latter to alter the distance between the water pipe and the closed loop clip such that the height of the water fountains can be adjusted in unison.

With the above and other objects in view that will hereinafter appear, the nature of the invention will be more clearly understood by reference to the following detailed description, the appended claimed subject matter, and the several views illustrated in the accompanying drawings.

IN THE DRAWINGS:

FIG. 1 is a perspective view of one of a plurality of water fountains designed for utilization in the suspension system of this invention, and illustrates the stem or supporting member thereof being secured to a water pipe.

FIG. 2 is a perspective view of a first clip of this invention, and illustrates two pairs of spaced legs joined by a bight portion.

FIG. 3 is a fragmentary perspective view of the water fountain supporting member, and illustrates the manner in which the clip of FIG. 2 is applied to a cage to suspendingly support the water fountain and an overhead pipe therefrom.

FIG. 4 is a cross-sectional view taken generally along line 4—4 of FIG. 3, and more clearly illustrates the manner in which the supporting member is held in position by the clamping action of the clip.

FIG. 5 is a sectional view of the assembled clip supporting member and cage taken along line 5—5 of FIG. 4, and more clearly illustrates the manner in which a reduced portion of the supporting member is received in slots between each pair of the clip legs.

FIG. 6 is a fragmentary side elevational view with portions broken away for clarity, and illustrates a pair of water fountains supported by a single clip from the cage and means between the clip and the water pipe for also supporting the latter from the clip.

FIG. 7 is a sectional view taken generally along line 7—7 of FIG. 6, and illustrates the manner in which the water pipe support is in embracing relationship to opposed bosses carried by the legs of the clip.

FIG. 8 is a slightly enlarged sectional view taken generally along line 8-8 of FIG. 6, and more clearly illustrates the manner in which the pipe support embraces the bosses of the clip legs while the latter are slotted to receive vertical wires of the cage to support the clip thereto.

FIG. 9 is a fragmentary enlarged sectional view taken generally along line 9—9 of FIG. 8, and illustrates details of the water pipe support in the form of a pair of legs embracing bosses of the clip legs.

A water fountain suspension system of this invention is generally designated by the reference numeral 10 and includes two different means 11, 12 (FIGS. 2 through 5 and 6 through 9, respectively) for suspendingly supporting one or more identical water fountains 13 from horizontal wires H of a cage C which also includes vertical wires V. Details of the water fountains 13 form no part of the present invention but incorporated herein by reference is the subject matter of application Ser. No. 230,388, entitled WATER FOUNTAIN, filed on Feb. 29, 1972, in the name of Frederick W. Steudler, Jr., and assigned to the assignee of the present application. For the purpose of understanding the system 10, it is sufficient to understand that each water fountain 13 includes means 15 for coupling the same to a water pipe W from which water flows through a tubular stem assembly or supporting member 16 into a cup 17 from which the water is drunk by the particular animals housed within the cage C. A portion 18 of the stem 16 is reduced in diameter and includes annular axially opposing faces or walls 19, 20. The reduced portion 18 may be marked with a circumferential line 21 which indicates a cut-off area such that the stem assembly 16 can be lengthened by connecting between the cut portions 18, 18 (FIG. 6) pieces of tubular pipe P in a manner to be described more fully hereinafter.

The first means or clip 11 (FIGS. 2 through 5) is designed to secure a single one of the water fountains 13 to the cage C by embracing the reduced portion 18 of the supporting member 16. The coupling means 11 is a generally U-shaped clip having lateral edges 25, 26. The clip 11 includes a generally arcuate bight portion 27 merging with two pairs of resilient generally parallel legs 28, 28, 29, 29 between each pair of which is a slot 30 opening outwardly through ends thereof in a direction away from the bight portion 27. The slots 30, 30 are dimensioned to snugly embrace the reduced portion 18 of the water fountain supporting member 16 to support the fountain 13 from the cage C in the manner best shown in FIGS. 3 and 4, as will be more fully described hereinafter. Each leg 28, 28, 29, 29 remote from the bight portion 27 has means for attaching the clip 11 to the horizontal wires H of the cage C, the first of the attaching means being defined by first surface means 33 of each leg facing the bight portion 27 for engaging an associated horizontal wire H at a side S1 remote from the stem or supporting member 16 of the associated water fountain 13. The attachment means is further defined by second surface means 34 of the legs for engaging the same horizontal wires H at adjacent sides S2 thereof. The clip 11 further includes as integral extensions of the legs 28, 28, 29, 29 oppositely directed arms 35, 35, 36, 36, respectively, the former of which includes an inclined or camming surface 37 which functions as means for progressively urging the legs 28, 29 toward each other during movement of the cam surface 37 along one of the horizontal wires H during an assembly operation, in the manner most apparent from FIGS. 3 and 4. That is, during an assembly operation, the clip 11 is first positioned such that the slot 30 between the legs 29 embraces the reduced portion 18 of the supporting member 16 with the arms 36, 36 thereof embracing the lowermost illustrated horizontal wires H. From this position with the lowermost horizontal wire H serving as a fulcrum or pivot, the clip 11 is pivoted or swung in the manner indicated by the unnumbered headed arrow associated therewith in FIG. 4 generally upwardly and counterclockwise whereupon the surface 37 of the arms 36 contacts and rides along the next uppermost of the horizontal wire H. The second uppermost wire H urges the legs 28, 28 downwardly toward the legs 29, 29 due to the resilience of the material from which the clip 11 is constructed until such time as the surfaces 37, 37 pass beyond the second uppermost wire H. Thereafter the natural resilience of the material of the clip 11 causes the legs 28, 28 to spring away from the legs 29, 29 to the position shown best in FIGS. 3 and 4 at which the legs 28, 29 engage the annular walls 20, 19, respectively, resulting in the securement of the water fountain 13 to the cage C. It will thus be noted from FIG. 4 that if for any reason the water fountain 13 is attempted to be drawn downwardly or upwardly, its downward or upward movement will be arrested by the legs 28, 29 engaging the annular walls 20, 19. Sidewise motion is obviously limited because of the location of the vertical wires V between the legs 28, 28 and 29, 29.

Reference is now made to the portion of the suspension system illustrated in FIGS. 6 through 9, and particularly to the coupling means or clip 12 which is best illustrated in FIG. 8 to which attention is now specifically directed. The clip 12 is shown embracing a pair of water pipes P of water fountains 13' by bight portions 42, 43 which open generally toward each other through reduced gaps 44. The water fountains 13' differ from the water fountain 13 in that each has been cut at its reduced diameter portion 18 to define two cut portions 18, 18 which telescopically receive the pipe P with the pipes P being embraced by the bight portions 42, 43. By selectively varying the pipe P lengths the height of the cup 17 from the cage bottom can be easily varied. The bight portions 42, 43 include a pair of legs 45, 46 common to each other having oppositely opening slots 47, 48. The slots 47, 48 are generally U-shaped in configuration when viewed from above or below (FIG. 8) and include parallel surface means 50, 51 and bridging surface means 52 therebetween. The grooves or slots 47, 48 function to unite the clip 12 to vertical wires V of the cage C by simply squeezing the clip to move the legs 45, 46 toward each other, inserting the clip between adjacent vertical wires V, and releasing the legs 45, 46 such that the natural resilience retains the clip 11 in a desired position. The clip 12 is structurally a closed loop duplicate of the clip 11 from the standpoint of including, as viewed at the right-hand portion of FIG. 8, a bight portion 42, legs 45, 46, attaching surface means 50 corresponding to the means 33 and second attaching surface means 52 corresponding to the surface means 34 of the clip 11. As viewed from the left in this same figure, the bight portion 43 includes portions of the legs 45, 46, with the surface means 51, 52 corresponding in structure and function to the surface means 33, 34 of the clip 11. The clip 12 functions to support not only the pair of the water fountains 13' from the cage C, but is also provided with means, generally designated by the reference numeral 60, for supporting the water pipe W from the cage C.

The supporting means 60 includes a pair of legs 61, 62 spaced from each other between respective free ends 63, 64 and a saddle portion 65. Since the pipe supporting member 60 is constructed from resilient plastic material, the saddle 65 will spread to receive the water pipe W and upon rebounding toward its initial position the water pipe W will be firmly clasped thereby. The legs 61, 62 include a plurality of opposing arcuate means 66 in the form of shallow cutouts which are contoured to embrace like contoured embossments 67 (FIGS. 8 and 9) of the legs 45, 46 of the clip 12. In FIG. 9 the embossments 67 of each leg 45, 46 are embraced by the shallow recesses 66 and through the arms 61, 62 the water pipe W is supported atop the cage at a desired distance to maintain the water cups 17 at a desired position above the bottom (not shown) of the cage C. In the absence of moving the clip 12 the water pipe W and both water fountains 13', 13' can be simultaneously moved either upwardly or downwardly by simply spreading the legs 61, 62, shifting the latter upwardly or downwardly with like movement of the water fountains 13 occurring as the pipes P slide in the bight portions 42, 43, and the subsequent re-establishment of connection between the desired recesses 66 and the embossments 67. The clip 12 thereby functions not only to support a pair of the water fountains 13' from the cage C, but also permits the water fountains to be adjusted simultaneously with the adjustment of the water pipe W by the adjustment means 66, 67 of the support means 60 and the clip 12. Moreover, outboard lateral edges or sides 70, 71 of the respective legs 61, 62 are normally spaced from each other a distance slightly greater than a pair of top horizontal wires T1, T2 of cage C (FIG. 6). The points T1, T2 thereby define fulcrum or pressure points against which the edges 70, 71 bear to continually urge the ends 63, 64 of the legs 61, 62 toward each other against the natural resilience of the legs 61, 62 tending to spread apart. Thus, irrespective of which of the recesses 66 receives the embossments 67 the latter are firmly gripped by the continued resistance offered against the legs 61, 62 by the fulcrum points T1, T2.

While preferred forms and arrangements of parts have been shown in illustrating the invention, it is to be clearly understood that various changes in details and arrangement of parts may be made without departing from the spirit and scope of this disclosure.

I claim:

1. A water fountain suspension system comprising a water fountain having a supporting member carrying a water cup, means for coupling said supporting member to wires of a cage, said coupling means being a clip having a portion for embracing said supporting member and a pair of spaced resilient legs projecting therefrom, each leg remote from said portion having means for attachment to a wire of a cage, said attachment means being defined by first surface means of each leg facing said portion for engaging a wire at a side remote from the water fountain supporting member, and said clip includes another supporting member embracing portion having common thereto said pair of legs.

2. The water fountain suspension system as defined in claim 1 wherein said supporting member embracing portions are directed toward each other.

3. The water fountain suspension system as defined in claim 1 wherein said supporting member embracing portions and legs define a closed loop, and at least one leg includes means carried thereby directed toward but terminating short of the other of said legs for securing a water pipe support to said clip.

4. The water fountain suspension system as defined in claim 1 wherein said supporting member embracing portions and legs define a closed loop, at least one leg includes means carried thereby directed toward but terminating short of the other of said legs for securing a water pipe support to said clip, and said supporting member embracing portions are directed toward each other.

5. A water fountain suspension system comprising a water fountain having a supporting member carrying a water cup, means for coupling said supporting member to wires of a cage, said coupling means being a clip having a portion for embracing said supporting member and a pair of spaced resilient legs projecting therefrom, each leg remote from said portion having means for attachment to a wire of a cage, said attachment means being defined by first surface means of each leg facing said portion for engaging a wire at a side remote from the water fountain supporting member, and said supporting member includes a pair of reduced circumferential portions spanned by a separate pipe and said portion is in engagement with said pipe.

6. A water fountain suspension system comprising a water fountain having a supporting member carrying a water cup, means for coupling said supporting member to wires of a cage, said coupling means being a clip having a portion for embracing said supporting member and a pair of spaced resilient legs projecting therefrom, each leg remote from said portion having means for attachment to a wire of a cage, said attachment means being defined by first surface means of each leg facing said portion for engaging a wire at a side remote from the water fountain supporting member, means for supporting a water pipe from said clip, and said water pipe supporting means includes first means for clampingly embracing a water pipe and second means removably securable to said clip.

7. The water fountain suspension system as defined in claim 6 wherein said second means are a pair of spaced resilient clamping legs between which are gripped said clip.

8. The water fountain suspension system as defined in claim 6 wherein said water pipe supporting means include a plurality of identical means spaced therealong for varying the point of securement of said securable means to said clip for adjusting the position of the latter relative to the water pipe.

9. The water fountain suspension system as defined in claim 7 wherein said clip includes another supporting member embracing portion having common thereto said pair of legs, said supporting member embracing portions and legs define a closed loop, and said clamping legs pass through the loop.

10. The water fountain suspension system as defined in claim 9 wherein at least one of said pair of clip legs includes means engageable by said clamping legs.

11. The water fountain suspension system as defined in claim 10 wherein said clamping legs include a plurality of identical means spaced therealong for varying the point of securement of said legs to said engageable means for adjusting the position of the latter relative to the water pipe.

12. A clip for securing an element to a plurality of crossed members comprising a body including a bight portion and a pair of spaced resilient legs projecting therefrom, each leg remote from said bight portion having means for attachment to one of said crossed members, said attachment means being defined by first surface means of each leg facing said bight portion for engaging one of said crossed members at a side remote from an element to be supported, and said attachment means being further defined by second surface means of said legs for engaging others of said crossed members at adjacent sides thereof whereby said first second surface means respectively preclude and/or limit straight line movement removal of the clip from the crossed members and effect resilient gripping of the element by said bight portion, and another bight portion having common thereto said pair of legs.

13. The clip as defined in claim 12 including means in each leg for receiving therethrough a horizontal member.

14. A clip for securing an element to a plurality of crossed members comprising a generally U-shaped body defined by a bight portion and a pair of spaced resilient legs projecting therefrom, each leg remote from said bight portion having a terminal end with means thereat for attachment to one of said crossed members, each leg having means for embracingly receiving a supporting member of a water fountain, and said embracing means being a slot in each leg opening in a direction away from said bight portion and through said terminal ends thereby forming each leg remote from said bight portion as a pair of spaced leg portions.

15. The clip as defined in claim 14 wherein said attachment means is defined by a first surface means of each leg portion facing said bight portion for engaging one of said crossed members at a side remote from a water supporting member of a water fountain adapted to be disposed in said slots.

16. The clip as defined in claim 14 wherein at least the leg portions of one of said legs includes cam surface means for progressively urging said legs toward each other during the movement of said cam surface means along one of said crossed members.

17. The clip as defined in claim 14 including a supporting member of a water fountain, said supporting member having a reduced portion, and said reduced portion being received in said slots.

18. The clip as defined in claim 15 wherein at least the leg portions of one of said legs includes cam surface means for progressively urging said legs toward each other during the movement of said cam surface means along one of said crossed members.

* * * * *